(12) United States Patent
Yuan et al.

(10) Patent No.: US 12,469,318 B2
(45) Date of Patent: Nov. 11, 2025

(54) TRAINING AND USING A VECTOR ENCODER TO DETERMINE VECTORS FOR SUB-IMAGES OF TEXT IN AN IMAGE SUBJECT TO OPTICAL CHARACTER RECOGNITION

(71) Applicant: INTERNATIONAL BUSINESS MACHINES CORPORATION, Armonk, NY (US)

(72) Inventors: Zhong Fang Yuan, Xi'an (CN); Tong Liu, Xi'an (CN); Yi Chen Zhong, Shanghai (CN); Xiang Yu Yang, Xi'an (CN); Guan Chao Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 17/932,639

(22) Filed: Sep. 15, 2022

(65) Prior Publication Data
US 2024/0096121 A1    Mar. 21, 2024

(51) Int. Cl.
*G06V 30/148* (2022.01)
*G06V 10/774* (2022.01)
(Continued)

(52) U.S. Cl.
CPC ........ *G06V 30/153* (2022.01); *G06V 10/7747* (2022.01); *G06V 10/82* (2022.01); *G06V 30/1823* (2022.01)

(58) Field of Classification Search
CPC .. G06V 30/153; G06V 10/7747; G06V 10/82; G06V 30/1823; G06V 30/43; G06V 30/245; G06V 10/467; G06V 30/19173
See application file for complete search history.

(56) References Cited

U.S. PATENT DOCUMENTS 11,640,436 B2 * 5/2023 Kale ................. G06N 5/02
                                                          707/771
2017/0124719 A1 * 5/2017 Long ................. G06V 30/413
(Continued)

FOREIGN PATENT DOCUMENTS

CA      3017646 C      2/2018
CN    109086756 B     12/2018

OTHER PUBLICATIONS

Salama, "Natural language image search with Dual Encoder", Keras, Jan. 30, 2021, 10pp [online] [retrieved Sep. 15, 2022] https://keras.io/examples/nlp/nl_image_search/.
(Continued)

*Primary Examiner* — John Villecco
*Assistant Examiner* — Han Hoang
(74) *Attorney, Agent, or Firm* — Konrad, Raynes, Davda & Victor LLP; David Victor

(57) ABSTRACT

Provided are a computer program product, system, and method for training and using a vector encoder to determine vectors for sub-images of text in an image to subject to optical character recognition. A vector encoder is trained to encode images representing text into vectors in a vector space. Vectors of images representing similar text have a high degree of cohesion in the vector space. Vectors of images representing dissimilar text have a low degree of cohesion in the vector space. An input image is processed to determine sub-images of the input image that bound text represented in the input image. The sub-images are inputted to the vector encoder to output sub-image vectors. The vector encoder generates a search vector for search text. Optical character recognition is applied to at least one region of the input image including the sub-images having sub-image vectors matching the search vector.

20 Claims, 9 Drawing Sheets

(51) Int. Cl.
*G06V 10/82* (2022.01)
*G06V 30/182* (2022.01)

(56) References Cited

U.S. PATENT DOCUMENTS

| | | |
|---|---|---|
| 2019/0279035 A1 | 9/2019 | Bluche |
| 2020/0175304 A1 | 6/2020 | Vig et al. |
| 2020/0327252 A1 | 10/2020 | McFall et al. |
| 2021/0149993 A1* | 5/2021 | Torres .................... G06N 3/045 |
| 2021/0295114 A1 | 9/2021 | Ye et al. |
| 2023/0368509 A1* | 11/2023 | Xu .......................... G06F 40/30 |
| 2023/0376828 A1* | 11/2023 | Zhao ...................... G06N 3/045 |
| 2024/0054748 A1* | 2/2024 | Gonsalves ................ G06T 7/70 |

OTHER PUBLICATIONS

Kostadinov, "Understanding Encoder Decoder Sequence to Sequence Model", Towards Data Science, Feb. 4, 2019, 7pp., [online][retrieved Aug. 18, 2022] https://towardsdatascience.com/understanding-encoder-decoder-sequenc . . . .

Purohit, "Tutorial Building custom OCR using YOLO and Tesseract", Saarthi.ai, May 9, 2019, 10pp., [online] [retrieved Aug. 18, 2022] https://medium.com/saarthi-ai/how-to-build-your-own-ocr-a5bb91b622ba.

* cited by examiner

Positive Training Set

Negative Training Set

Sub-Image Information

FIG. 8

TRAINING AND USING A VECTOR ENCODER TO DETERMINE VECTORS FOR SUB-IMAGES OF TEXT IN AN IMAGE SUBJECT TO OPTICAL CHARACTER RECOGNITION

BACKGROUND OF THE INVENTION

1. Field of the Invention

The present invention relates to a computer program product, system, and method for training and using a vector encoder to determine vectors for sub-images of text in an image subject to optical character recognition.

2. Description of the Related Art

Structured data extraction from documents involves searching a document for keywords or sections of relevance from which to extract information. Keyword search and entity recognition are used to determine words in the text that match the specified data to search and extract. When a document is in a digital image file format, optical character recognition (OCR) may be applied to convert the scanned image into text that may then be searched using common text recognition to locate the text to return or extract.

The standard OCR process OCR is divided into two serial steps—text line detection and text recognition. Both steps require use of a deep neural network (DNN) and latency will increase as the amount of text information in the image increases.

There is a need in the art to provide improved techniques for extracting and searching for text in a document represented in an image in an image file format.

SUMMARY

Provided are a computer program product, system, and method for training and using a vector encoder to determine vectors for sub-images of text in an image to subject to optical character recognition. A vector encoder is trained to encode images, comprising digital images representing text, into vectors in a vector space. Vectors of images representing similar text have a high degree of cohesion in the vector space. Vectors of images representing dissimilar text have a low degree of cohesion in the vector space. An input image is processed to determine sub-images, of the input image. The sub-images bound text represented in the input image. The sub-images are inputted to the vector encoder to output sub-image vectors. The vector encoder is used to generate a search vector for search text. A determination is made of sub-image vectors that match the search vector. Optical character recognition is applied to at least one region of the input image including the sub-images having sub-image vectors matching the search vector.

BRIEF DESCRIPTION OF THE DRAWINGS

FIG. 8 illustrates an example of bonding boxes generated from an image of a document.

DETAILED DESCRIPTION

Described embodiments provide improved computer technology for determining regions of a digital image in an image file format having text that matches search text to which optical character recognition (OCR) will be applied. Described embodiments determine bounding boxes of text in the image and then apply a vector encoder to determine vectors for the sub-images in the bounding boxes that map to points in the vector space based on a cohesion of the text represented by the images. The vectors are used to determine sub-images representing text that match a search vector the vector encoder generates from the search text. The sub-images representing text matching the search text are subject to OCR conversion. The described embodiments avoid having to apply OCR to the entire document by determining those specific sections or bounding boxes of the image representing text matching the search text so only those bounding boxes of relevance are subject to OCR conversion. This substantially reduces latency and use of computational resources for the OCR process by limiting the OCR conversion to only those regions of the image representing the relevant text.

Further described embodiments provide improved computer technology for training the vector encoder with a positive training set of images representing similar words to a base word in a data set, such as a dictionary, and with a negative training set of images representing words dissimilar to the base word. The vector encoder is trained to generate vectors that locally aggregate images representing similar words close together in the vector space and generate vectors that sufficiently separate images representing dissimilar words in the vector space to have low cohesion, and should not be found to match or be similar.

Figure 1:
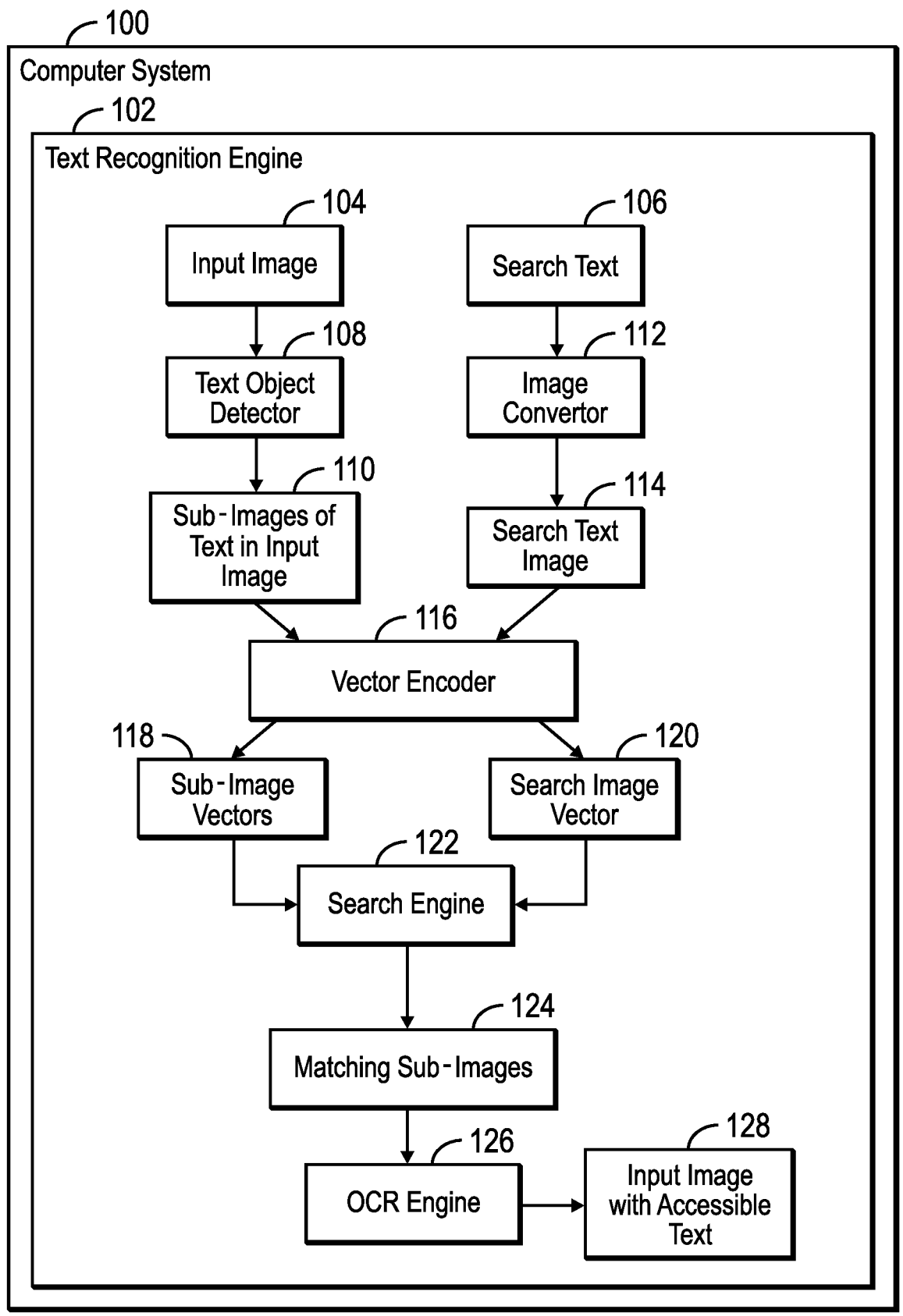
FIG. 1 illustrates an embodiment of a text recognition engine.

FIG. 1 illustrates an embodiment of a computer system 100 including a text recognition engine 102 to determine regions of an input image 104, or bounding boxes, of text represented in the input image 104 that matches received search text 106 to subject to optical character recognition ("OCR). The input image 104 may comprise a digital image representing a document or other text that is composed of picture elements, such as a raster image, bitmap image (GIF, JPEG, PNG, etc.), vector image, etc. A text object detector 108, such as You Only Look Once (YOLO), processes the input image 104 to determine sub-images 110 of text represented in the input image 104, also known as word-level sub-graphs. An image convertor 112 converts the search text 106 to a search text image 114, comprising a digital image of the text in an image file format.

The sub-images 110 are inputted into a vector encoder 116 which outputs sub-image vectors 118 that represent the sub-images 110 in a vector space. Sub-images 110 representing similar text have high cohesion in the vector space, i.e., are aggregated locally in the vector space to indicate similarity. The sub-images 110 representing dissimilar or distinct text have low cohesion in the vector space, i.e., are at points sufficiently far apart to indicate dissimilar content.

The search text image 114 is inputted into the vector encoder 116 to generate a search image vector 120 to map the search text image 114 to a point in the vector space. A search engine 122 receives the sub-image vectors 118 and search image vector 120 and determines sub-images 110 having sub-image vectors 124 that match the search image vector 120. A match may occur when a sub-image vector 118 is sufficiently close to the search image vector 120 in the vector space to indicate similar or matching content. An optical character recognition ("OCR") engine 126 processes the bounding boxes, or coordinates in the input image 104, to determine the text represented by the matching sub-images 124. The input image 128 comprises the input image 104 with the converted text for the matching sub-images 124. The matching sub-images 124 in the input image 128 may be highlighted to direct the user to the sections or sub-images 124 of the input image 128 representing text matching the received search text 106. Additionally, the converted text for the matching sub-images 124 may be extracted for further processing, storage, etc.

The above text recognition engine 102 substantially reduces the latency and utilized computational resources to determine text in an input image by locating regions of the input image 104 representing the text of interest to the user, i.e., the search text 106. With this process, the computationally expensive OCR process is only performed on those regions of the image 104 representing the text of interest.

Figure 2:
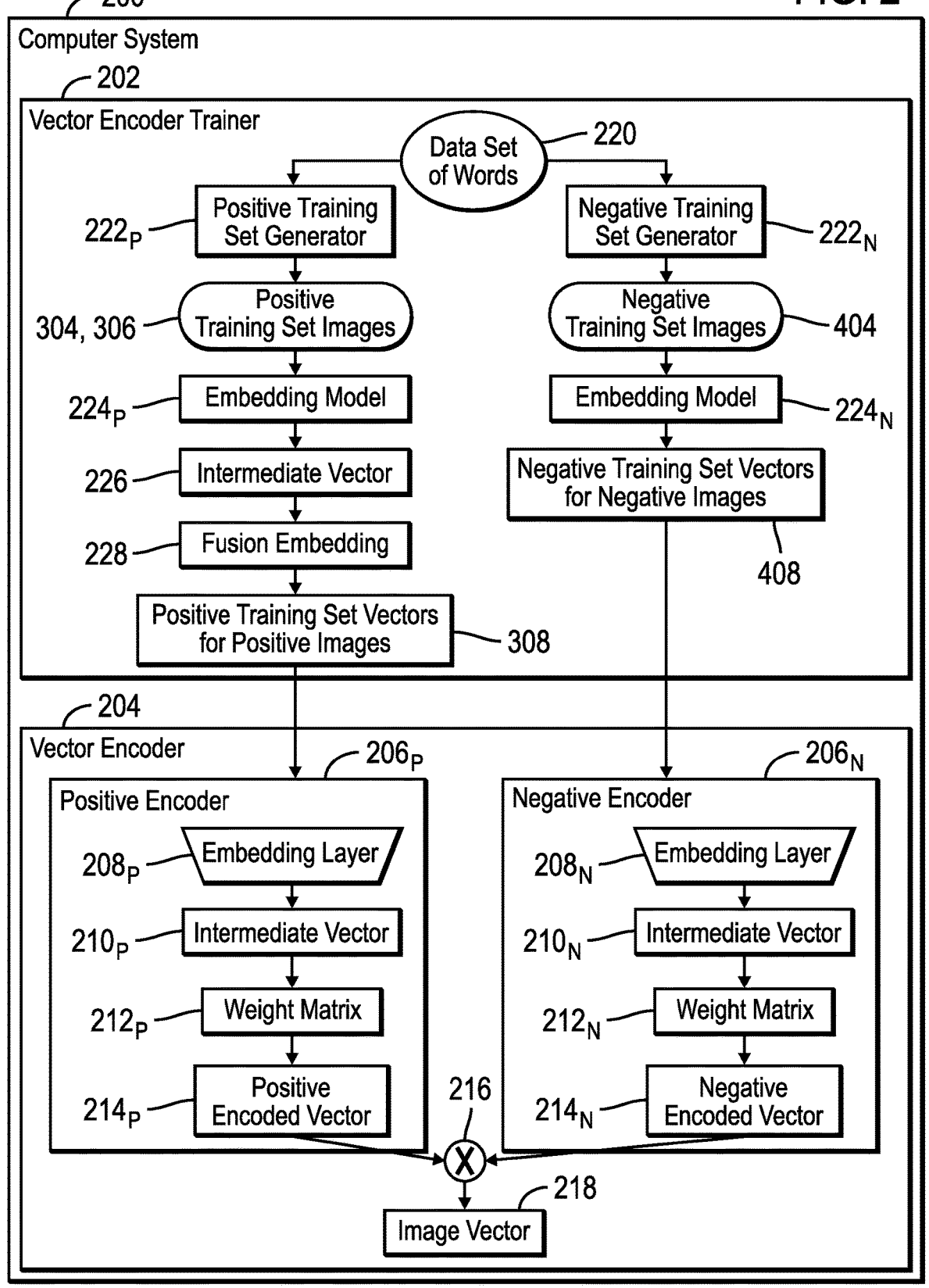
FIG. 2 illustrates an embodiment of a vector encoder trainer to train a vector encoder.

FIG. 2 includes a computer system 200 having a vector encoder trainer 202 to train vector encoder 204, which comprises one embodiment of the vector encoder 116 in FIG. 1. The computer system 200 may be used by a developer of the text recognition engine 102 to train the vector encoder 204 to improve its predictability and distribute to computer systems 100 having the text recognition engine 102 to update the deployed vector encoder 116. Alternatively, the vector encoder trainer 202 may be deployed in the user computer system 100 to periodically train the vector encoder 116 to improve vector encoder 116 predictability.

Figure 3:
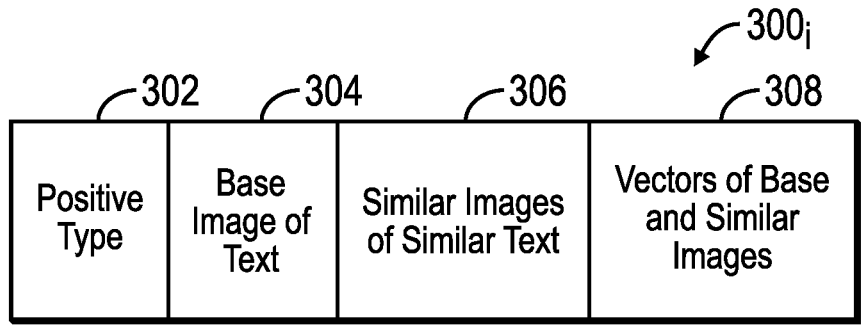
FIG. 3 illustrates an embodiment of a positive training set.
Figure 4:
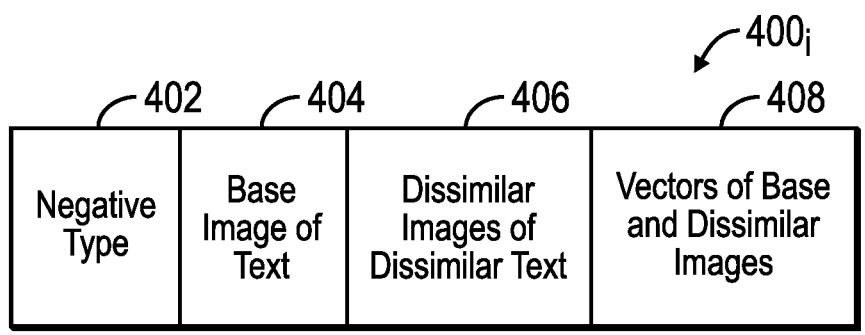
FIG. 4 illustrates an embodiment of a negative training set.

In one embodiment, the vector encoder 204 comprises a double tower network having a positive encoder $206_P$, trained with a positive training set $300_i$ (FIG. 3) of images representing similar text, and a negative encoder $206_N$, trained with a negative training set $400_i$ (FIG. 4) of images representing dissimilar text. The encoders $206_P$, $206_N$ are consistent in network structure. Each encoder $206_P$, $206_N$ includes an embedding layer $208_P$, $208_N$ to process an input image, such as a sub-image 110, and generate an intermediate vector $210_P$, $210_N$ to represent the input sub-image 110 in a low dimensional vector space. A weight matrix $212_P$, $212_N$ applies weights, such as in the form of weights in a hidden state, to the intermediate vector $210_P$, $210_N$ that are similar to a multi-head attention mechanism to generate variants of the intermediate state vectors $210_P$, $210_N$ to prevent overfitting. In one embodiment, the weight matrices $212_P$, $212_N$ may comprise a transformer encoder, such as a Convoluted Neural Network (CNN) transformer encoder. The result of applying the weight matrices $212_P$, $212_N$ are positive $214_P$ and negative $214_N$ encoded vectors, respectively. The encoded vectors $214_P$, $214_N$ are combined, by a concatenator 216 that concatenates the vectors $214_P$, $214_N$ of each tower $206_P$, $206_N$ into a final image vector 218 for the sub-image 110.

The vector encoder trainer 202 trains the vector encoder 204 by generating positive training sets $300_i$ and negative training sets $400_i$ from base words in a data set of words 20. A data set of words 220, may comprise a bag of words from a dictionary or a domain specific dictionary or data set. For a base word from the data set 220, a positive training set generator $222_P$ creates similar words by varying one or more characters in the base word, changing the font and style to produce images 304, 306 of the base word and similar words, respectively, in an instance of a positive training set $300_i$ shown in FIG. 3, which is indicated as a positive type 302 training set. For a base word from the data set 220, a negative training set generator $222_N$ determines dissimilar words to the base word to produce images 406 of the dissimilar words in an instance of a negative training set $400_i$ shown in FIG. 4, which is indicated as a negative type 402 training set.

A positive embedding model $224_P$ processes the images 304, 306 to produce intermediate vectors 226 representing the images 300 in a vector space. Fusion embedding 228 further processes the vectors 226 from the embedding model $224_P$ to produce the positive training set vectors 308 (FIG. 3) for the positive training set images 304, 306. The fusion embedding 228 may use an information fusion mechanism to focus on the links of the images of similar words so they are grouped closer in the vector space to indicate their similarity, such as by concatenating the vectors for the similar images. The fusion embedding 228 may utilize an attention mechanism and generate multiple vectors 306 through multiple dropout operations that are regarded as positive samples similar to the base vector.

Embedding model $224_N$ processes the dissimilar images 406 (FIG. 4) to produce vector representations 408 of the dissimilar images 406 so the images 406 are sufficiently distant in the vector space from the base word 404 to indicate dissimilarity.

The embedding model $224_P$, $224_N$ may utilize an already trained OCR model convolutional recurrent neural network (CRNN) to generate the vectors for the images.

The positive training set $300_i$ may then be used to train the positive encoder $206_P$ to produce the positive training set vectors 308 from input comprising the similar images 304, 306 for the positive vectors 308 by adjusting weights and biases in the positive embedding layer $208_P$ and the weight matrix $212_P$ to minimize a loss function between the output positive encoded vectors $214_P$ and the positive training set vectors 308.

The negative training set 400i may then be used to train the negative encoder $206_N$ to produce the negative training set vectors 408 from input comprising the dissimilar images 404, 406 for the negative vectors 408 by adjusting weights and biases in the negative embedding layer $208_N$ to minimize a loss function between the output negative encoded vectors $214_N$ and the negative training set vectors 408.

In one embodiment, the vector encoder 116 in the text recognition engine 102 may comprise the trained vector encoder 204 in FIG. 2. In alternative embodiments, a different vector encoder utilizing different embedding technologies and machine learning techniques may be used.

The arrows shown in FIGS. 1 and 2 between the components and objects in the text recognition engine 102, vector encoder trainer 202, and vector encoder 204 represent a data flow between the components.

In certain embodiments, many of the described components, such as the text object detector 108, vector encoder 116, search engine 122, OCR engine 126, embedding models $224_P$, $224_N$, fusion embedding 226, embedding layers $208_P$, $208_N$, and weight matrices $212_P$, $212_N$ may use machine learning and deep learning algorithms, such as decision tree learning, association rule learning, neural networks, inductive programming logic, support vector machines, Bayesian network, recurrent neural networks (RNN), Feedforward neural networks, Convolutional Neural Networks (CNN), etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the expected output having specified confidence levels based on the input parameters. For instance, the embedding layers $208_P$, $208_N$, and weight matrices $212_P$, $212_N$ may be trained to produce training set vectors 308, 408, respectively, from the training set input images 304, 306 and 406. Similarly, the embedding model $224_P$ may be trained to produce vectors to locally aggregate similar images 306 in the vector space with the base image 304, and the embedding model $224_N$ may be trained to produce vectors that map dissimilar images 406 sufficiently apart in the vector space to indicate low cohesion with respect to the base image 404.

Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation used to train a neural network machine learning module, margins of error are determined based on a difference of the calculated predictions and user rankings of the output. Biases (parameters) at nodes in the hidden layer are adjusted accordingly to minimize the margin of error of the error function.

In an alternative embodiment, other techniques may be used to train the components, such as an unsupervised machine learning module, or machine learning implemented in methods other than neural networks, such as multivariable linear regression models.

Generally, program modules, such as the program components 108, 112, 116, 122, 126, $222_P$, $222_N$, $224_P$, $224_N$, 226, $208_P$, $208_N$, $212_P$, $212_N$ may comprise routines, programs, objects, components, logic, data structures, and so on that perform particular tasks or implement particular abstract data types. The program components and hardware devices of the computer systems 100 and 200 of FIGS. 1 and 2 may be implemented in one or more computer systems, where if they are implemented in multiple computer systems, then the computer systems may communicate over a network.

The program components in FIGS. 1 and 2, including components 108, 112, 116, 122, 126, $222_P$, $222_N$, $224_P$, $224_N$, 226, $208_P$, $208_N$, $212_P$, $212_N$ may be accessed by a processor from memory to execute. Alternatively, some or all of the program components in FIGS. 1 and 2, including components 108, 112, 116, 122, 126, $222_P$, $222_N$, $224_P$, $224_N$, 226, $208_P$, $208_N$, $212_P$, $212_N$ may be implemented in separate hardware devices, such as one or more Application Specific Integrated Circuit (ASIC) hardware devices.

The functions described as performed by the program components of FIGS. 1 and 2, including components 108, 112, 116, 122, 126, $222_P$, $222_N$, $224_P$, $224_N$, 226, $208_P$, $208_N$, $212_P$, $212_N$ may be implemented as program code in fewer program modules than shown or implemented as program code throughout a greater number of program modules than shown.

The program components described as implemented in the computers 100 and 200 may be implemented in a single computer.

The computers 100 and 200 may comprise a personal computing device, such as a laptop, desktop computer, tablet, smartphone, wearable computer, server class computing devices, or other suitable computing devices.

Figure 5:
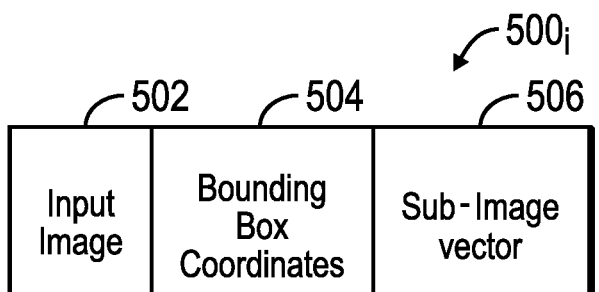
FIG. 5 illustrates an embodiment of sub-image information.

FIG. 5 illustrates an embodiment of sub-image information 500, for a sub-image 110 and indicates the input image 502 including the sub-image, bounding box coordinates, as determined by the text object detector 108, of the coordinates in the input image 502 where the sub-image is located, and the sub-image vector 506, such as vector 118, determined for the sub-image identified by the bounding box coordinates 504.

Figure 6:
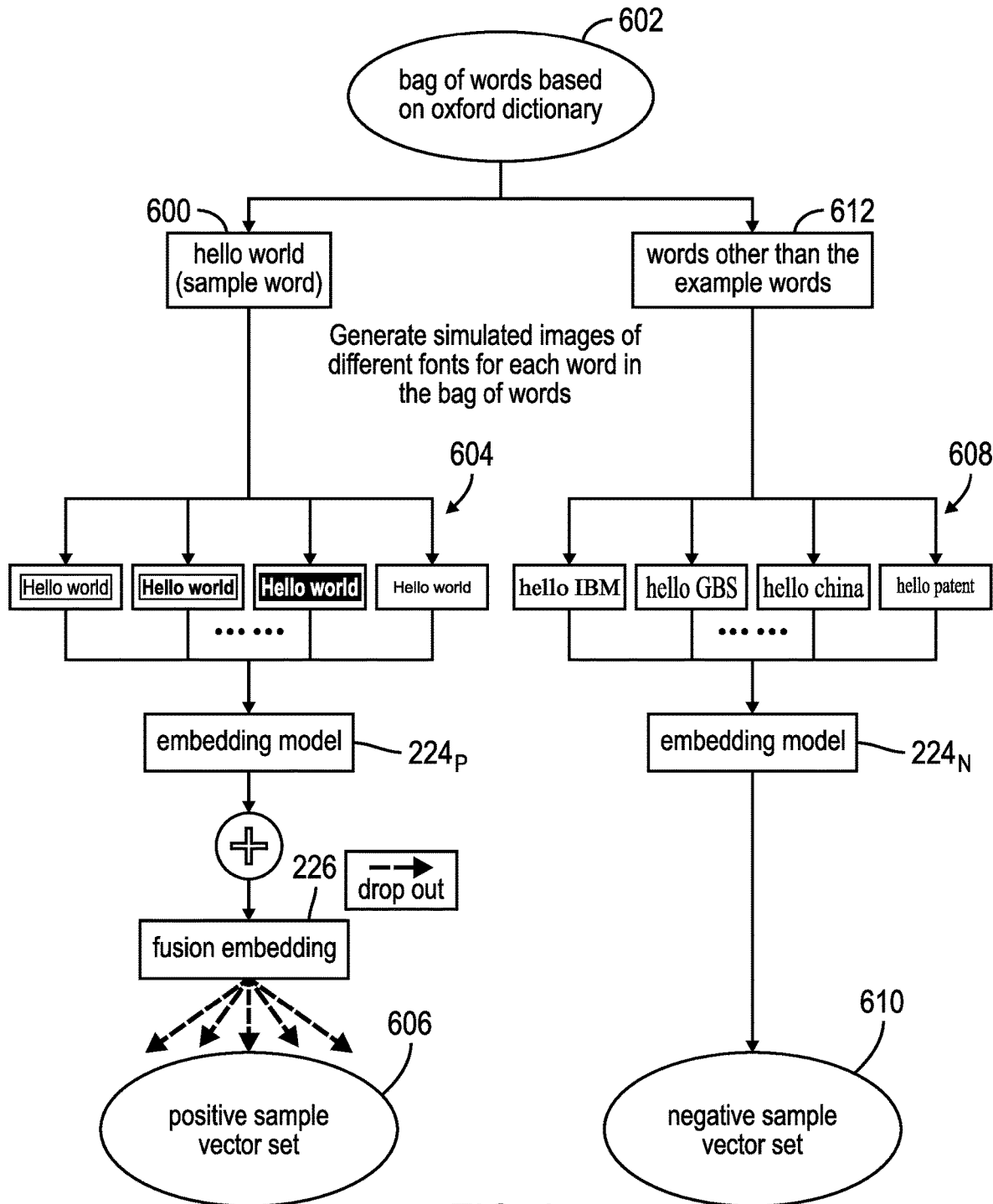
FIG. 6 illustrates an example of generating positive and negative training sets for a sample word.

FIG. 6 illustrates an example of how positive and negative training sets are created for a sample text "hello world" 600 from a bag of words 602 from a dictionary. The positive training set images 604 comprise slight variations of the sample word 600, in varying characters, font, and style. Positive training set vectors 606 for the training set images 604 are determined by processing from the embedding model $224_P$ and the fusion embedding 228. The negative training set of dissimilar images 608 representing dissimilar words 612, from the bag of words 602, to that of the sample text 600 are formed and then inputted into the embedding model $224_N$ to generate negative vectors 610 for the dissimilar images 608 for training.

Figure 7A:
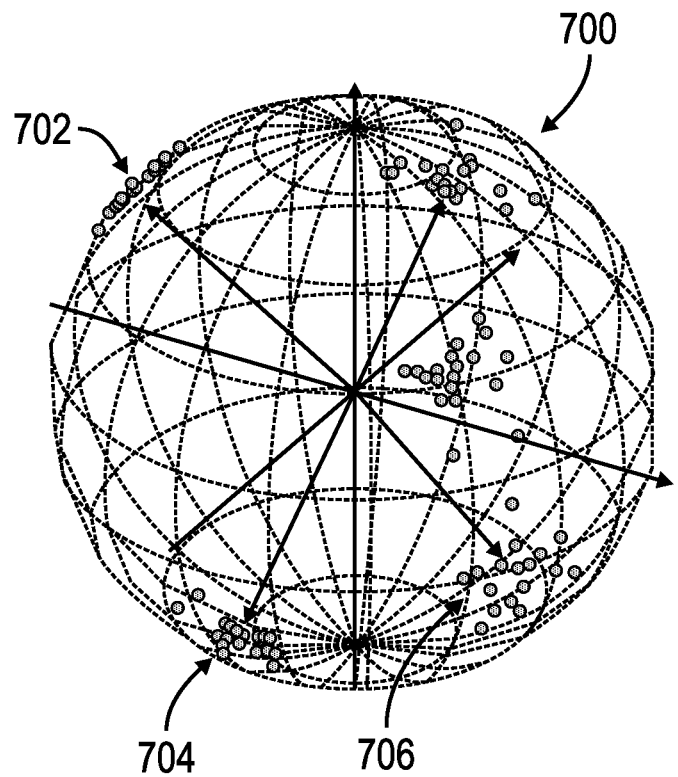
FIGS. 7*a* and 7*b* illustrate examples of a vector space of vectors generated by an embedding layer for images representing text.

FIG. 7a illustrates a vector space 700 to which the vectors map. Vectors 606 for similar words 600, 604 map to points, vectors, in the vector space that are clustered together, such as in clusters 702, 704, 706. Vectors in different of the clusters, such as 702 and 704 are far apart, indicating the text represented in the images for vectors within separate clusters far apart in the vector space are dissimilar text. Vectors within a cluster 702 are for images representing similar text.

Figure 7B:
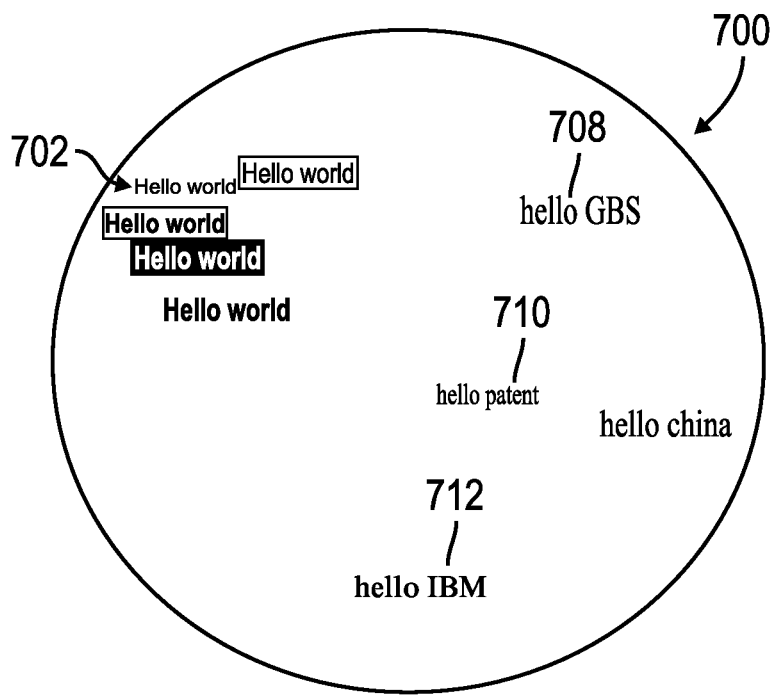

FIG. 7b illustrates how images 702 representing similar words are close together in the vector space 700 and images representing text dissimilar to the sample term 600 are far apart, such as images 708, 710, 712 being far apart from images representing text similar to the base or sample text 600.

Figure 8:
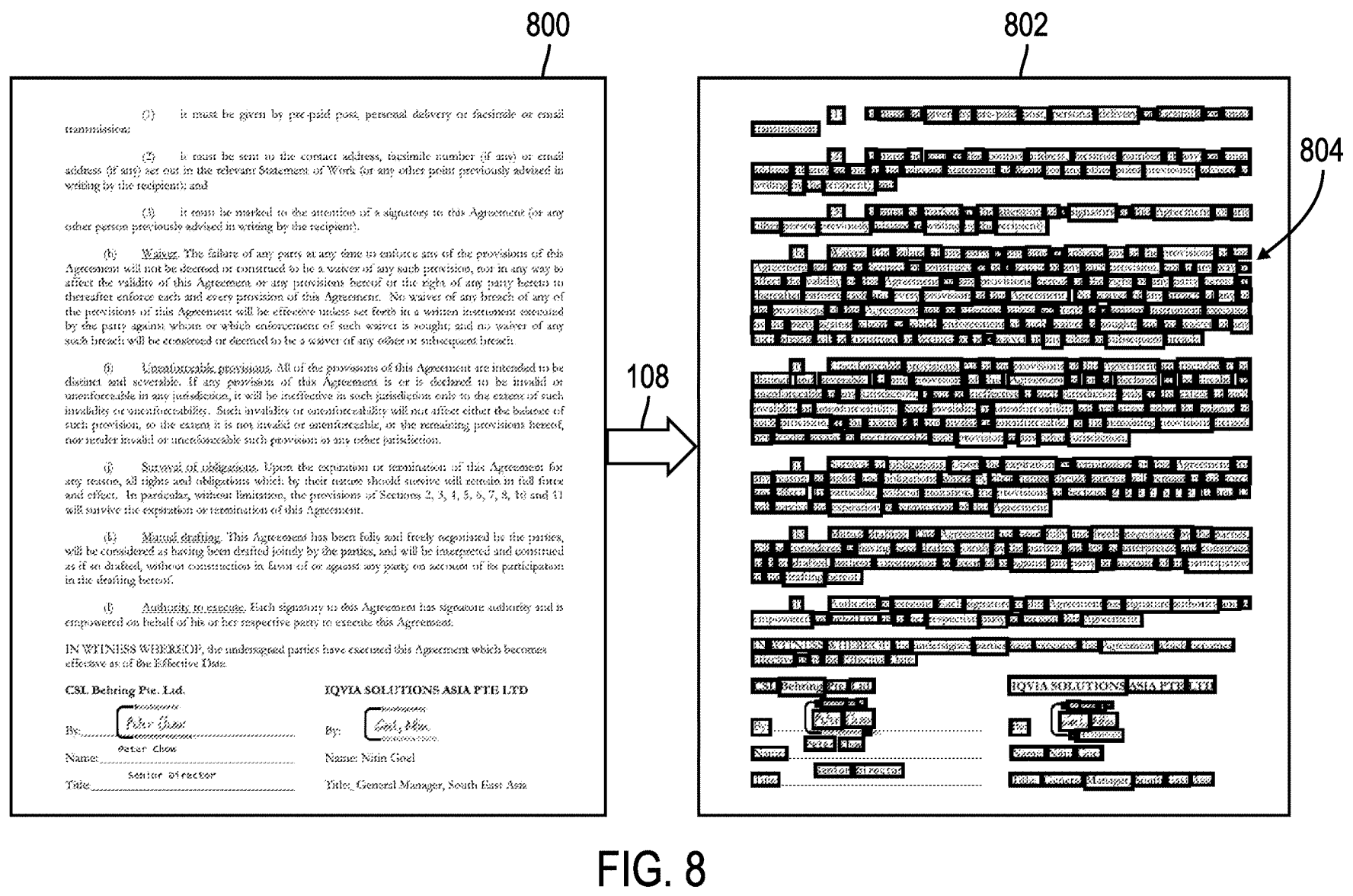

FIG. 8 provides an example of an input image 800 comprising a digital image of a document that is processed by the text object detector 108 to determine the bounding boxes shown in image 802 as the boxes around the words in the text, such as 804.

Figure 9:
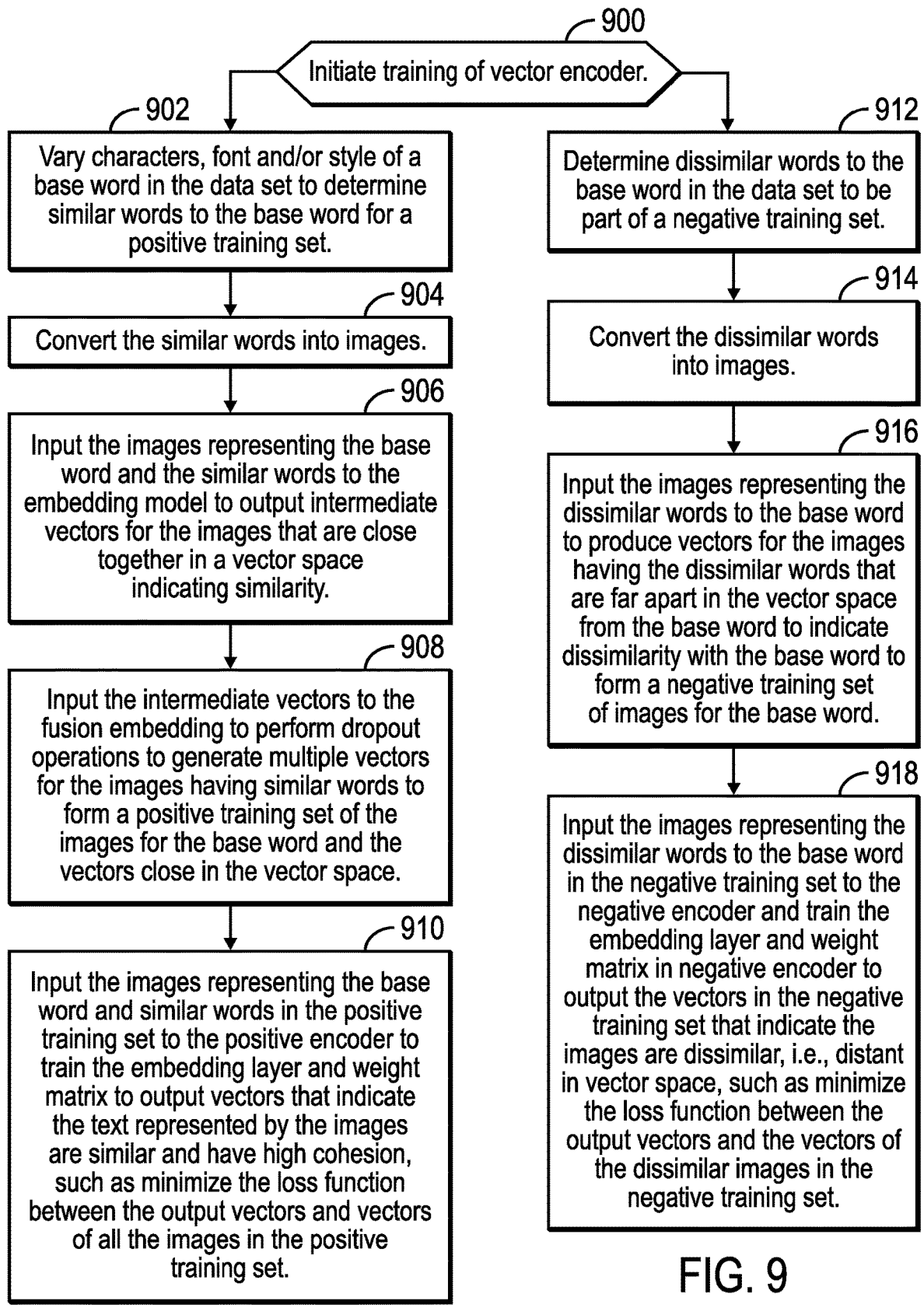
FIG. 9 illustrates an embodiment of operations to train the vector encoder.

FIG. 9 illustrates an embodiment of operations performed by the vector encoder trainer 202 to train the vector encoder 204 to improve the vector embeddings determined for images representing text to provide cohesion or local aggregation of vectors in the vector space for images representing similar text and to provide for disaggregation or separation in the vector space of images representing dissimilar text. Upon initiating (at block 900) training of the vector encoder 204, the positive training set generator $222_P$ varies (at block 902) characters, font and/or style of a base word in the data set 220 to determine similar words to the base word for a positive training set $300_i$. The positive training set generator $222_P$ includes an image convertor to convert (at block 904)

the base and similar words to digital images 304, 306. The images 304, 306 representing the base word and the similar words are inputted (at block 906) to the embedding model $224_P$ to output intermediate vectors 226 for the images that are close together in a vector space, indicating similarity. The intermediate vectors 226 are input (at block 908) to the fusion embedding 228 to perform dropout operations to generate multiple vectors 308 for the base 304 and similar 306 images representing similar words that map to points aggregated locally in the vector space to indicate high cohesion of the similar words or text.

The images of the base word 304 and similar words 306 in the positive training set $300_i$ are inputted (at block 910) to the positive encoder $206_P$ to train the embedding layer $208_P$ and the weight matrix $212_P$ to output the vectors 306, determined for the images by the embedding model $224_P$ and fusion embedding 228, that indicate the text represented by the images have a high degree of cohesion, are aggregated locally in the vector space. The training may minimize a loss function between positive encoded vectors $214_P$ and the positive vectors 308 in the positive training set $300_i$.

To perform contrastive training, the negative training set generator $222_N$ may determine (at bock 912) dissimilar words 406 to the base word 404 in the data set 220 to be part of a negative training set $400_i$. The negative training set generator $222_N$ may include an image convertor to convert the dissimilar words (at block 914) into images 406. The images 406 representing the dissimilar words are inputted (at block 916) to the negative embedding model $224_N$ to produce vectors 408 for the images representing dissimilar words that are sufficiently apart in the vector space from the base word 404 to indicate dissimilarity with the image representing the base word 404.

The images 406 representing dissimilar words to the base word 404 in the negative training set $400_i$ are inputted (at block 918) to the negative encoder to train the embedding layer $208_N$ and weight matrix $212_N$ in the negative encoder $206_N$ to output the vectors 408 in the negative training set $400_i$ that indicate the images are dissimilar, i.e., distant in vector space, to the base image 404. The training may minimize the loss function between the output vectors $214_N$ and the vectors 408 of the dissimilar images 406 in the negative training set $400_i$.

With the embodiment of FIG. 9, the vector encoder trainer 202 trains the vector encoder 204 based on positive images representing similar text to the base text and negative images representing text dissimilar to a base text. Multiple iterations of this contrastive training may be repeated for different instances of base text. In this way, the vector encoder 204 is trained to provide embeddings and a vector for images based on the text represented in the images, so that images representing more similar text are clustered and locally aggregated in the vector space and images representing dissimilar text are separated in the vector space. The vectors of images indicate an extent of cohesion of the images with respect to the text they represent without having to perform optical character recognition of the image to produce the text. Instead, the vector encoder 204 performs the embedding directly on the input image, which maps the image to a point in the vector space based on the content of the image.

Figure 10:
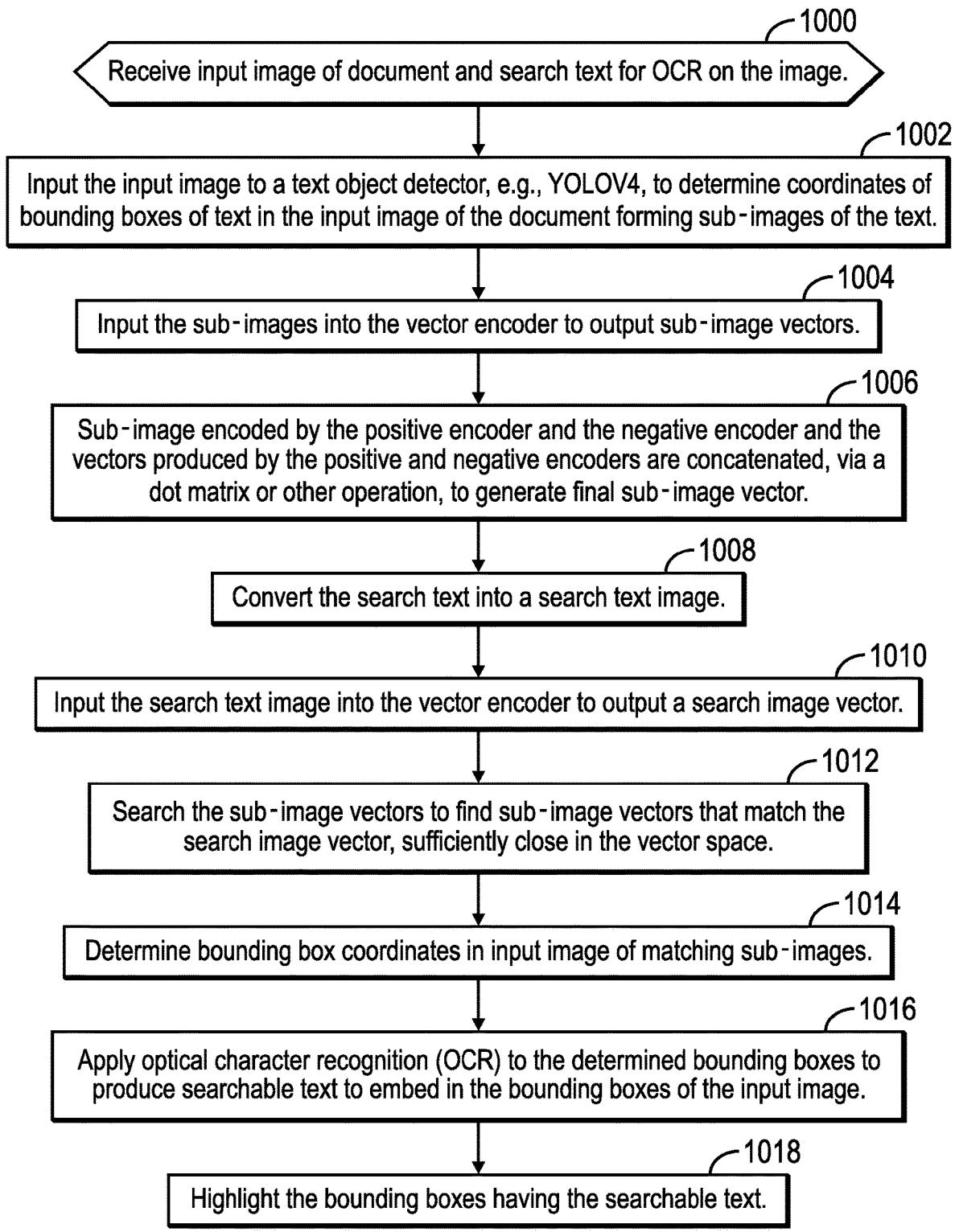
FIG. 10 illustrates an embodiment of operations to determine regions of an image to subject to optical character recognition (OCR).

FIG. 10 illustrates an embodiment of operations performed by the text recognition engine 102 to determine the regions of an input image 104 representing text that matches search text 106 provided by a user to limit the OCR operation to those regions of the image 104 representing text matching the search text 106. Upon receiving (at block 1000) an input image 104 and search text 106, the text recognition engine 102 inputs (at block 1002) the input image 104 to the text object detector 108, e.g., YOLOV4, to determine coordinates of bounding boxes of text in the input image 104 of the document forming sub-images 110 of the text, defined by bounding box coordinates 504. The sub-images 110 are inputted (at block 1004) to the vector encoder 116, 204 to output sub-image vectors 118, 218 that map the sub-images 110 to a vector space based on the text they represent. In the vector encoder 204, the sub-image 110 is encoded (at block 1006) by the positive encoder $206_P$ and the negative encoder $206_N$ to produce the positive $214_P$ and negative $214_N$ vectors, respectively, that are concatenated 216, via a dot matrix or other concatenation operation, to generate final sub-image vector 218. The image convertor 112 may convert (at block 1008) the search text 106 to a search text image 114, such as digital image, representing the search text 106. The search text image 114 is inputted (at bock 1010) into the vector encoder 116 to output a search image vector 120.

The search engine 122 searches (at block 1012) the sub-image vectors 118 to find sub-images 124 having sub-image vectors that match the search image vector 120, i.e., are sufficiently close/aggregated in the vector space. The bounding box coordinates 504 of the matching sub-images 124 in the input image 104 are determined (at block 1014). The OCR engine 126 applies (at block 1016) optical character recognition (OCR) to the determined bounding boxes to produce searchable text to embed in the bounding boxes of the input image 104. The bounding boxes having the searchable text may be highlighted (at block 1018) to direct user attention to those regions of the input image 104 having the matching search text 106. Additionally, the generated text for the sub-images 110 may be extracted for further processing and use.

With the embodiment of FIG. 10, the text recognition engine 102 does not need to perform OCR conversion on the entire image 104, which is a time consuming and computationally expensive process. Instead, the text recognition engine 102 may first determine boundary boxes of text in the input image 104 and then determine embeddings or a vector for the boundary boxes input image 104, and then perform a search based on a vectorized image of the search text to determine those bounding boxes having vectors matching or with a high cohesion to the vector generated from the search text. The OCR conversion is then applied to those limited number of bounding boxes representing text matching the search text 106. Avoiding having to perform OCR conversion on the entire input document 104 reduces latency of the search process and requires less computational resources, because most of the computing is handled by relatively fast components such as the text object detector 108 and vector encoder 116, which is substantially faster and requires substantially less computing resources than applying OCR analysis to the entire image 104.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation or garbage collection, but this does not render the storage device as transitory because the data is not transitory while it is stored.

Figure 11:
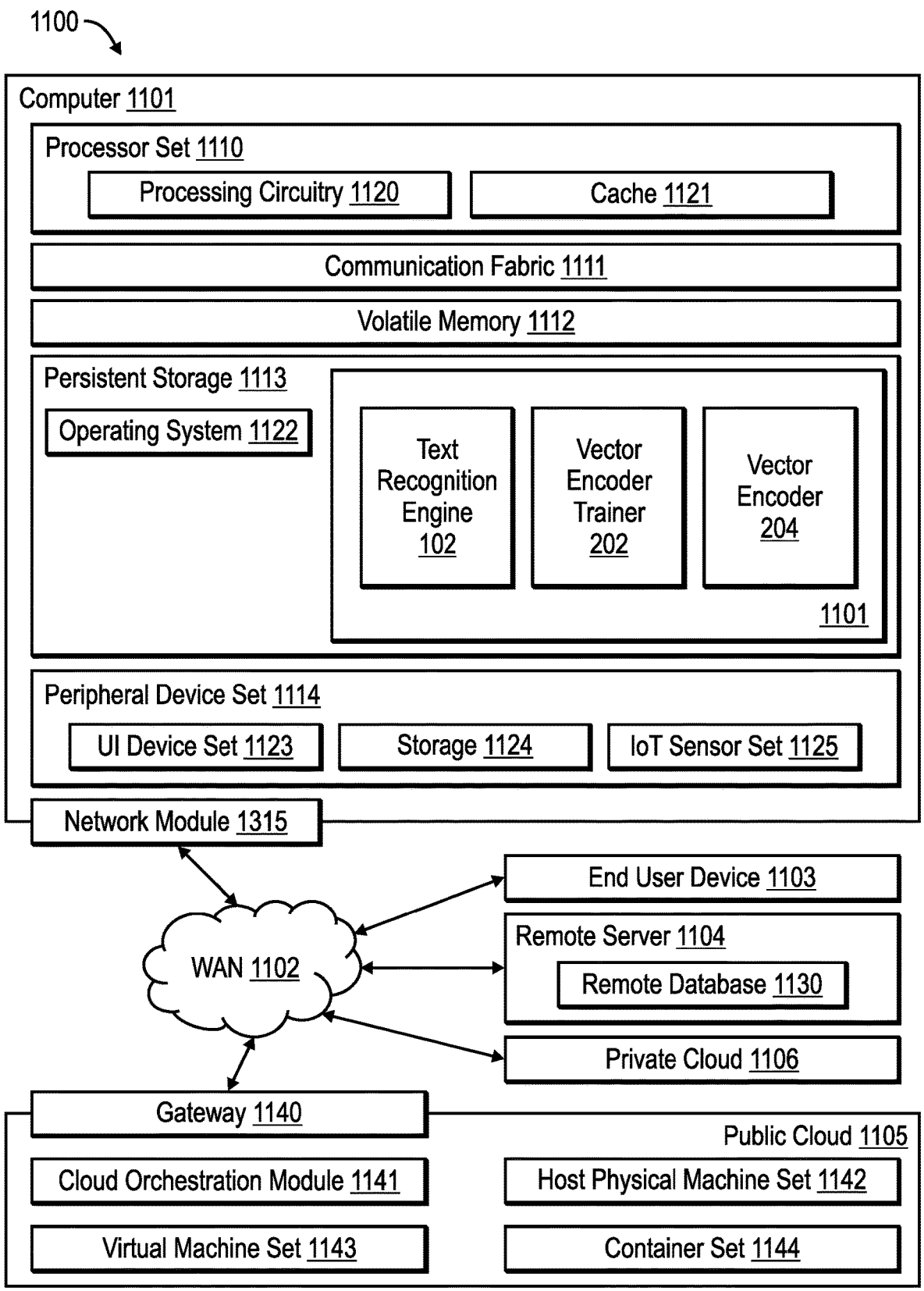
FIG. 11 illustrates a computing environment in which the components of FIGS. 1 and 2 may be implemented.

Referring now to FIG. 11, computing environment 1100 contains an example of an environment for the execution of at least some of the computer code 1101 involved in performing the inventive methods, such as the text recognition engine 102, the vector encoder trainer 202, and the vector encoder trainer 204. (FIGS. 1 and 2).

In addition to block 1101, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 200 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for performing optical character recognition processing of an image, the computer program product comprising a computer readable storage medium having computer readable program code embodied therein that is executable to perform operations, the operations comprising:

providing a vector encoder trained to encode images, comprising digital images representing text, into vectors in a vector space, wherein vectors of images representing similar text have a high degree of cohesion in the vector space, and wherein vectors of images representing dissimilar text have a low degree of cohesion in the vector space;

processing an input image to determine sub-images, of the input image, wherein the sub-images bound the text represented in the input image;

inputting the sub-images to the vector encoder to output sub-image vectors, wherein the sub-image vectors represent the sub-images in the vector space;

using the vector encoder to generate a search vector for search text, wherein the search vector represents the search text in the vector space;

determining the sub-image vectors that match the search vector; and applying optical character recognition to at least one region of the input image including the sub-images having the sub-image vectors matching the search vector based on closeness of the sub-image vectors and the search vector in the vector space.

2. The computer program product of claim 1, wherein the operations further comprise:

converting the search text to a search image, wherein using the vector encoder to generate the search vector comprises inputting the search image to the vector encoder to output the search vector.

3. The computer program product of claim 1, wherein the vector encoder is trained to encode images by:

inputting a positive set of images representing similar text to a base text into an embedding model to generate positive vectors for the positive set of images representing similar text to the base text, wherein the positive vectors are sufficiently close in the vector space to indicate similarity of the text represented by the positive set of images to the base text;

inputting a negative set of images representing dissimilar text to the base text into the embedding model to generate negative vectors for the negative set of images representing dissimilar text to the base text, wherein the negative vectors are sufficiently separated in the vector space to indicate dissimilarity of the text represented by the negative set of images;
training the vector encoder to output the positive vectors for the positive set of images; and
training the vector encoder to output the negative vectors for the negative set of images.

4. The computer program product of claim 3, wherein the positive set of images is generated by:
for the base text, generating a plurality of similar text formed by slight variations in characters, font and style of the base text; and
converting the base text and the similar text into the positive set of images, wherein the negative set of images is generated by:
for the base text, determining dissimilar text to the base text; and
converting the dissimilar text into the negative set of images.

5. The computer program product of claim 3, wherein the positive vectors produced by the embedding model for the positive set of images comprise intermediate vectors, wherein the operations further comprise:
performing fusion embedding of the intermediate vectors to generate the positive vectors for the positive set of images.

6. The computer program product of claim 3, wherein the vector encoder comprises a double tower network comprising a positive encoder having a positive embedding layer and a negative encoder having a negative embedding layer,
wherein the training the vector encoder to output the positive vectors comprises training the positive embedding layer to output the positive vectors from the positive set of images, and
wherein the training the vector encoder to output the negative vectors comprises training the negative embedding layer to output the negative vectors from the negative set of images.

7. The computer program product of claim 1, wherein the vector encoder comprises a double tower network comprising a first encoder having a first embedding layer and a second encoder having a second embedding layer, wherein the vector encoder outputs a vector for a sub-image of the sub-images by:
outputting, by the first embedding layer, a first vector for the sub-image;
outputting, by the second embedding layer, a second vector for the sub-image; and
combining the first vector and the second vector to obtain the vector for the sub-image.

8. The computer program product of claim 1, wherein the vector encoder includes an embedding layer to output an intermediate vector from an input image and includes a weight matrix to apply hidden states to the intermediate vector to generate a vector for the input image.

9. The computer program product of claim 8, wherein the weight matrix implements a transfer encoder to adjust the intermediate vector.

10. A system for performing optical character recognition processing of an image, comprising:
at least one processor; and
a computer readable storage medium having computer readable program code embodied therein that is executable by the at least one processor to perform operations, the operations comprising:
providing a vector encoder trained to encode images, comprising digital images representing text, into vectors in a vector space, wherein vectors of images representing similar text have a high degree of cohesion in the vector space, and wherein vectors of images representing dissimilar text have a low degree of cohesion in the vector space;
processing an input image to determine sub-images, of the input image, wherein the sub-images bound the text represented in the input image;
inputting the sub-images to the vector encoder to output sub-image vectors, wherein the sub-image vectors represent the sub-images in the vector space;
using the vector encoder to generate a search vector for search text, wherein the search vector represents the search text in the vector space;
determining the sub-image vectors that match the search vector; and
applying optical character recognition to at least one region of the input image including the sub-images having the sub-image vectors matching the search vector based on closeness of the sub-image vectors and the search vector in the vector space.

11. The system of claim 10, wherein the operations further comprise:
converting the search text to a search image, wherein using the vector encoder to generate the search vector comprises inputting the search image to the vector encoder to output the search vector.

12. The system of claim 10, wherein the vector encoder is trained to encode images by:
inputting a positive set of images representing similar text to a base text into an embedding model to generate positive vectors for the positive set of images representing similar text to the base text, wherein the positive vectors are sufficiently close in the vector space to indicate similarity of the text represented by the positive set of images to the base text;
inputting a negative set of images representing dissimilar text to the base text into the embedding model to generate negative vectors for the negative set of images representing dissimilar text to the base text, wherein the negative vectors are sufficiently separated in the vector space to indicate dissimilarity of the text represented by the negative set of images;
training the vector encoder to output the positive vectors for the positive set of images; and
training the vector encoder to output the negative vectors for the negative set of images.

13. The system of claim 12,
wherein the positive set of images is generated by:
for the base text, generating a plurality of similar text formed by slight variations in characters, font and style of the base text; and
converting the base text and the similar text into the positive set of images, wherein the negative set of images is generated by:
for the base text, determining dissimilar text to the base text; and
converting the dissimilar text into the negative set of images.

14. The system of claim 12, wherein the vector encoder comprises a double tower network comprising a positive encoder having a positive embedding layer and a negative encoder having a negative embedding layer,
wherein the training the vector encoder to output the positive vectors comprises training the positive embedding layer to output the positive vectors from the positive set of images, and wherein the training the vector encoder to output the negative vectors comprises training the negative embedding layer to output the negative vectors from the negative set of images.

15. The system of claim 12, wherein the vector encoder comprises a double tower network comprising a first encoder having a first embedding layer and a second encoder having a second embedding layer, wherein the vector encoder outputs a vector for a sub-image of the sub-images by:
  outputting, by the first embedding layer, a first vector for the sub-image;
  outputting, by the second embedding layer, a second vector for the sub-image; and
  combining the first vector and the second vector to obtain the vector for the sub-image.

16. A computer implemented method for performing optical character recognition processing of an image, comprising:
  providing a vector encoder trained to encode images, comprising digital images representing text, into vectors in a vector space, wherein vectors of images representing similar text have a high degree of cohesion in the vector space, and wherein vectors of images representing dissimilar text have a low degree of cohesion in the vector space;
  processing an input image to determine sub-images, of the input image, wherein the sub-images bound the text represented in the input image;
  inputting the sub-images to the vector encoder to output sub-image vectors, wherein the sub-image vectors represent the sub-images in the vector space;
  using the vector encoder to generate a search vector for search text, wherein the search vector represents the search text in the vector space;
  determining the sub-image vectors that match the search vector; and
  applying optical character recognition to at least one region of the input image including the sub-images having the sub-image vectors matching the search vector based on closeness of the sub-image vectors and the search vector in the vector space.

17. The computer implemented method of claim 16, further comprising:
  converting the search text to a search image, wherein using the vector encoder to generate the search vector comprises inputting the search image to the vector encoder to output the search vector.

18. The computer implemented method of claim 16, wherein the vector encoder is trained to encode images by:
  inputting a positive set of images representing similar text to a base text into an embedding model to generate positive vectors for the positive set of images representing similar text to the base text, wherein the positive vectors are sufficiently close in the vector space to indicate similarity of the text represented by the positive set of images to the base text;
  inputting a negative set of images representing dissimilar text to the base text into the embedding model to generate negative vectors for the negative set of images representing dissimilar text to the base text, wherein the negative vectors are sufficiently separated in the vector space to indicate dissimilarity of the text represented by the negative set of images;
  training the vector encoder to output the positive vectors for the positive set of images; and
  training the vector encoder to output the negative vectors for the negative set of images.

19. The computer implemented method of claim 18, wherein the vector encoder comprises a double tower network comprising a positive encoder having a positive embedding layer and a negative encoder having a negative embedding layer,
  wherein the training the vector encoder to output the positive vectors comprises training the positive embedding layer to output the positive vectors from the positive set of images, and
  wherein the training the vector encoder to output the negative vectors comprises training the negative embedding layer to output the negative vectors from the negative set of images.

20. The computer implemented method of claim 16, wherein the vector encoder comprises a double tower network comprising a first encoder having a first embedding layer and a second encoder having a second embedding layer, wherein the vector encoder outputs a vector for a sub-image of the sub-images by:
  outputting, by the first embedding layer, a first vector for the sub-image;
  outputting, by the second embedding layer, a second vector for the sub-image; and
  combining the first vector and the second vector to obtain the vector for the sub-image.

* * * * *